Patented Sept. 26, 1933

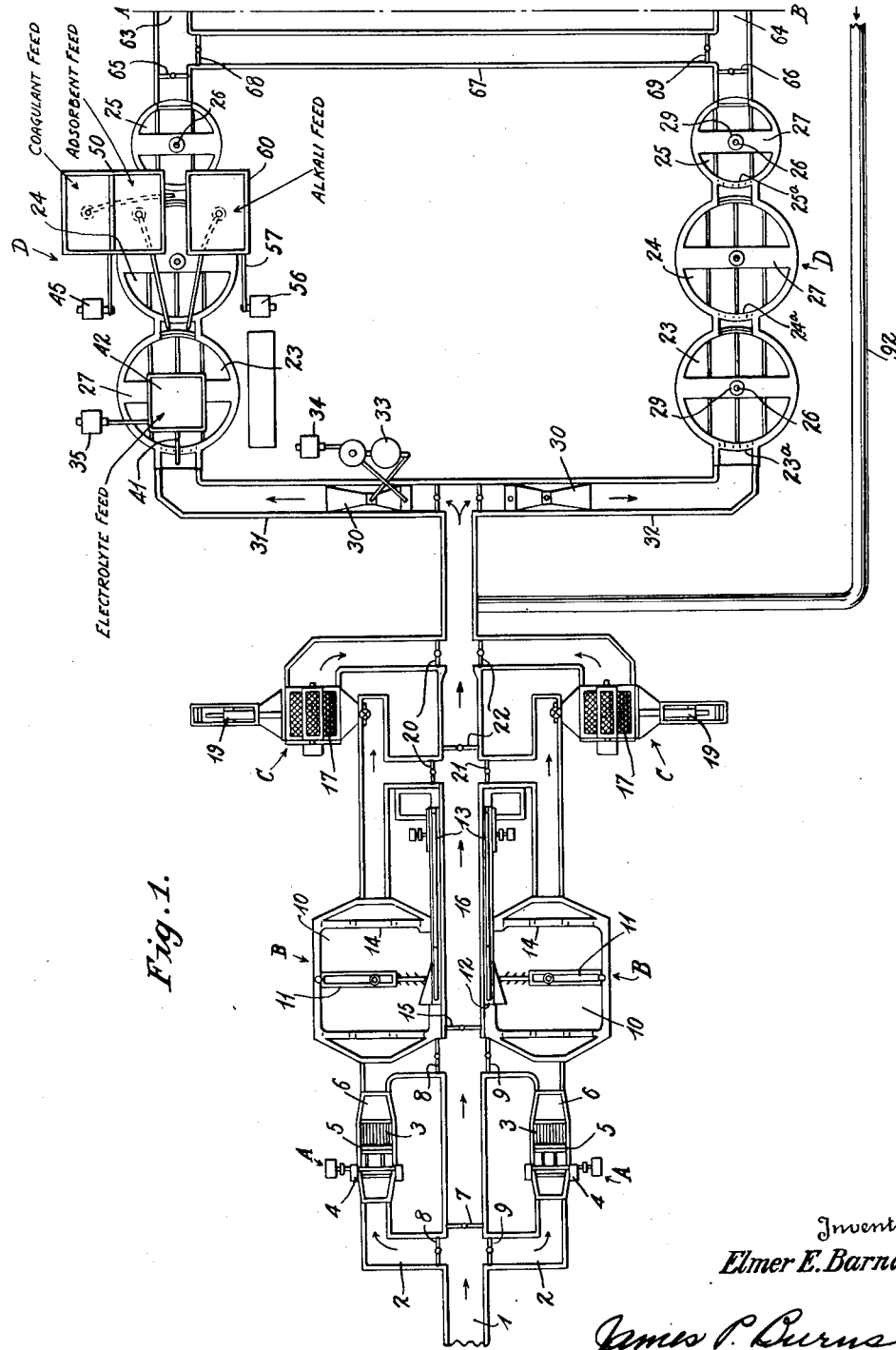

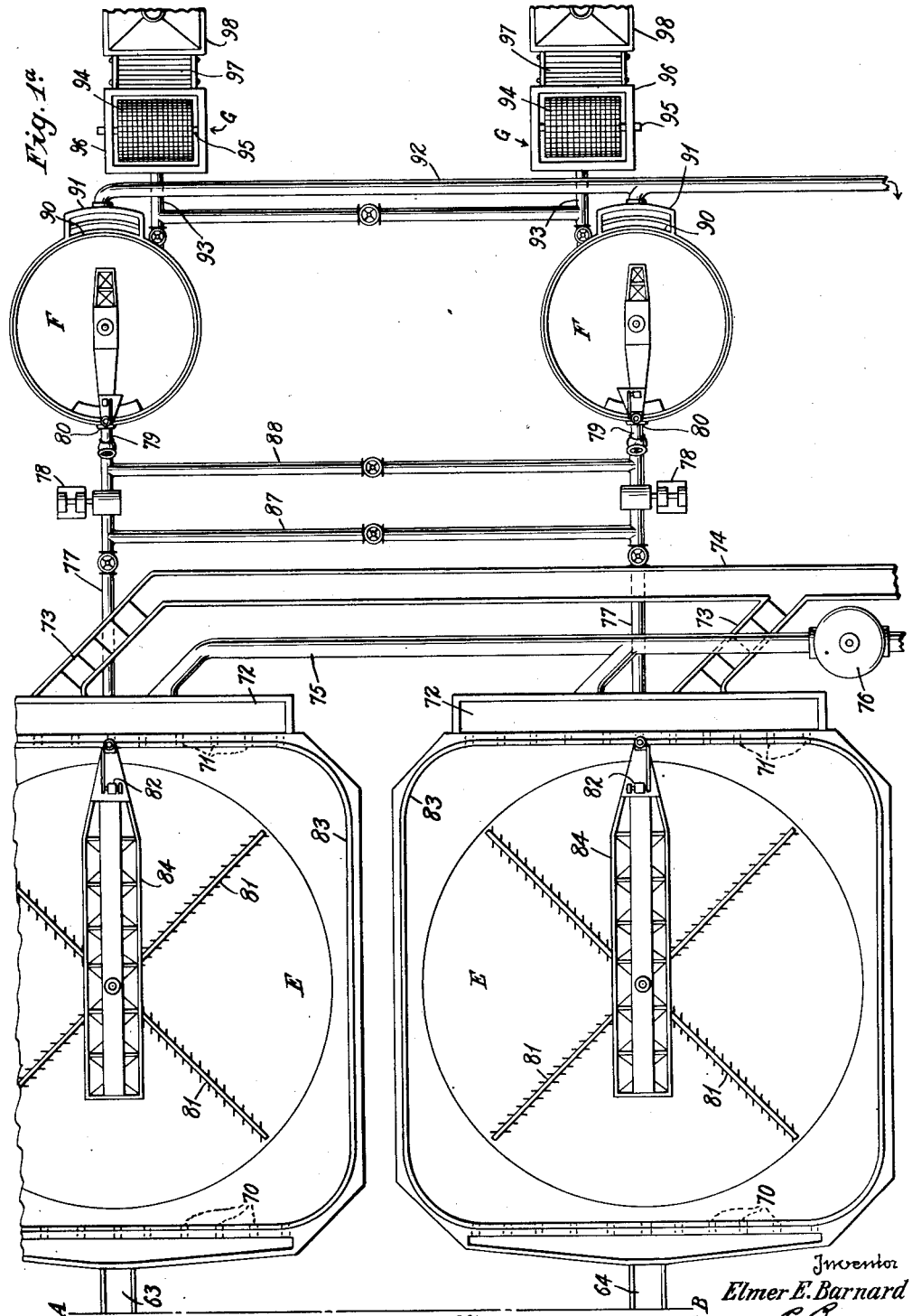

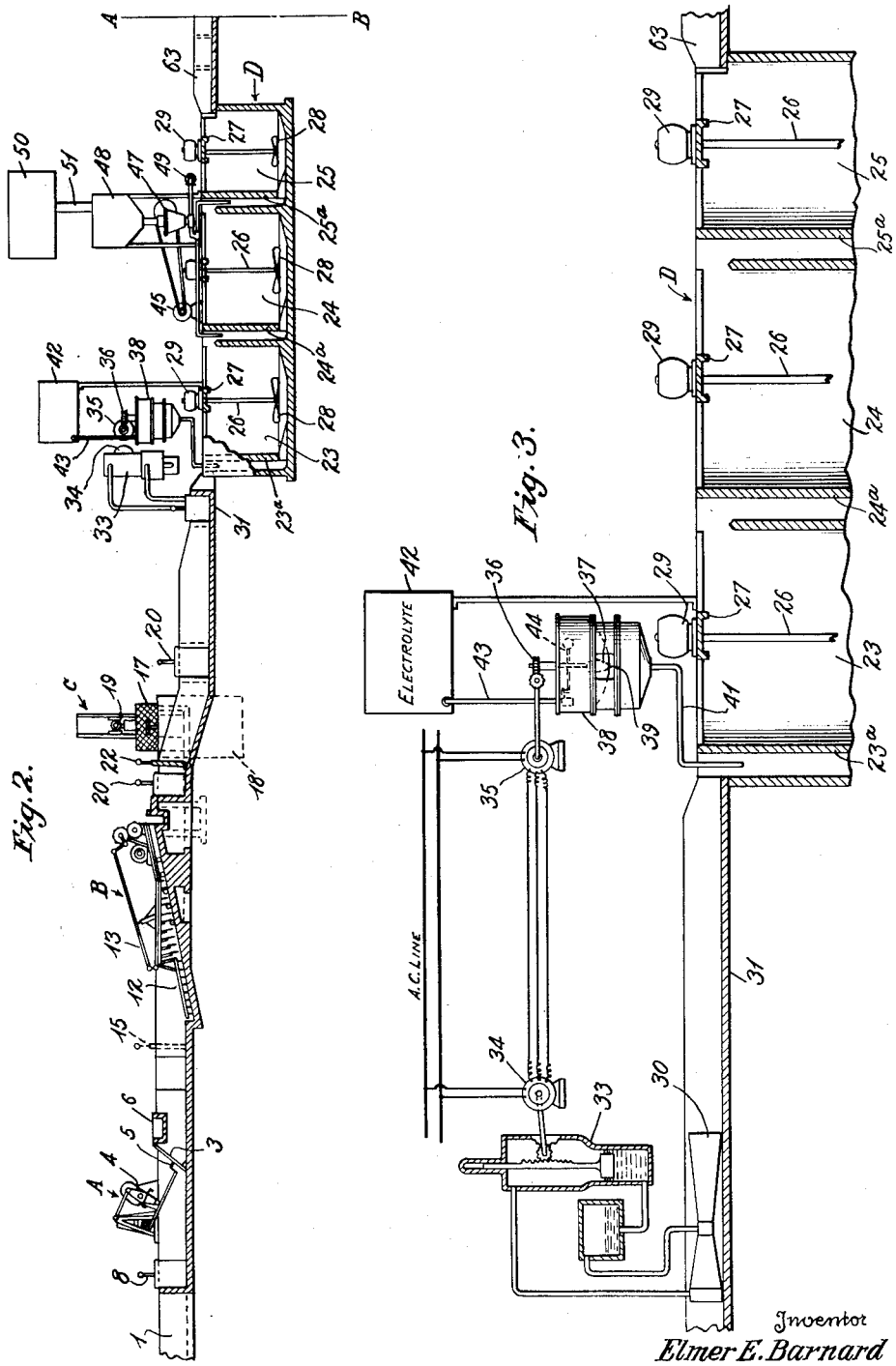

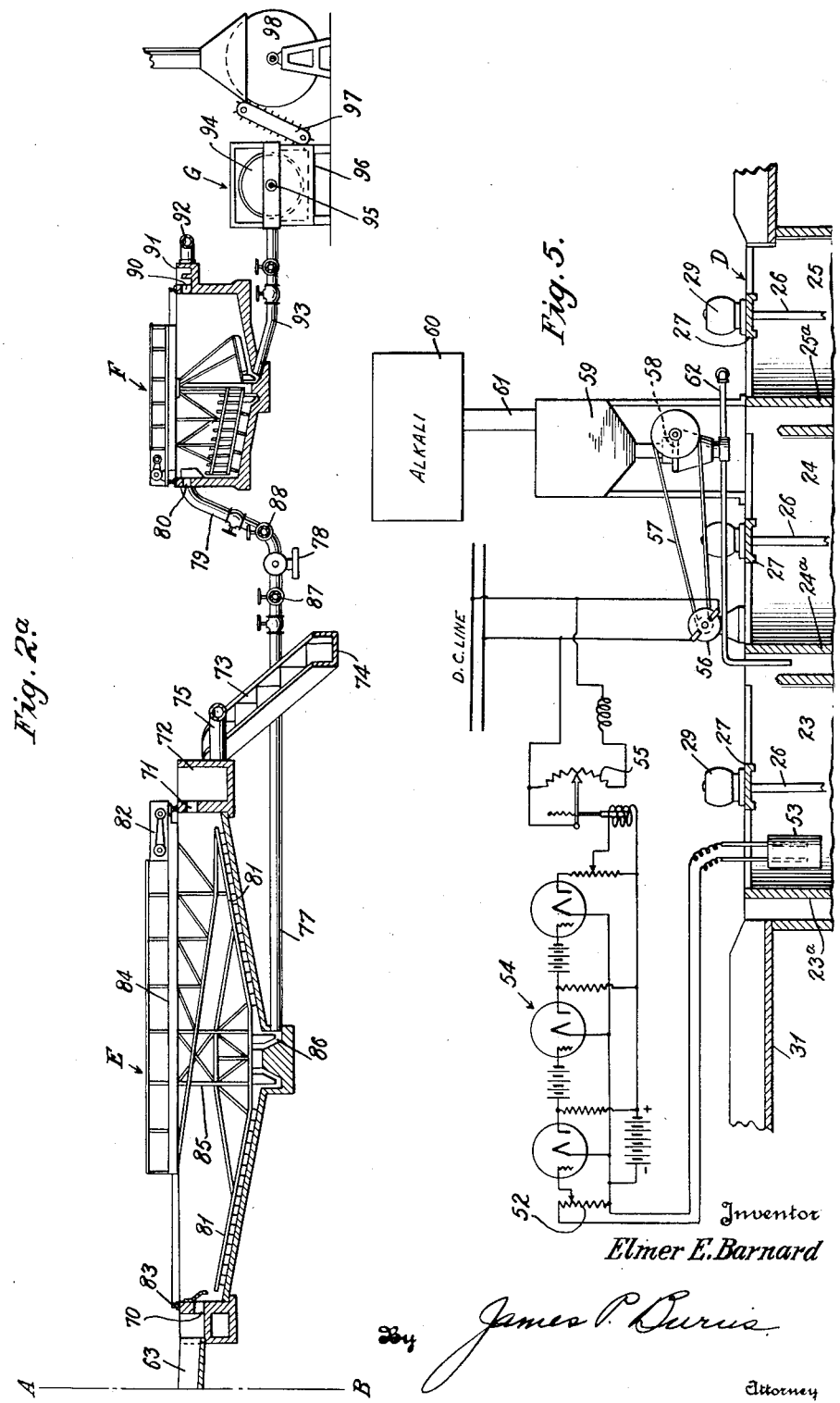

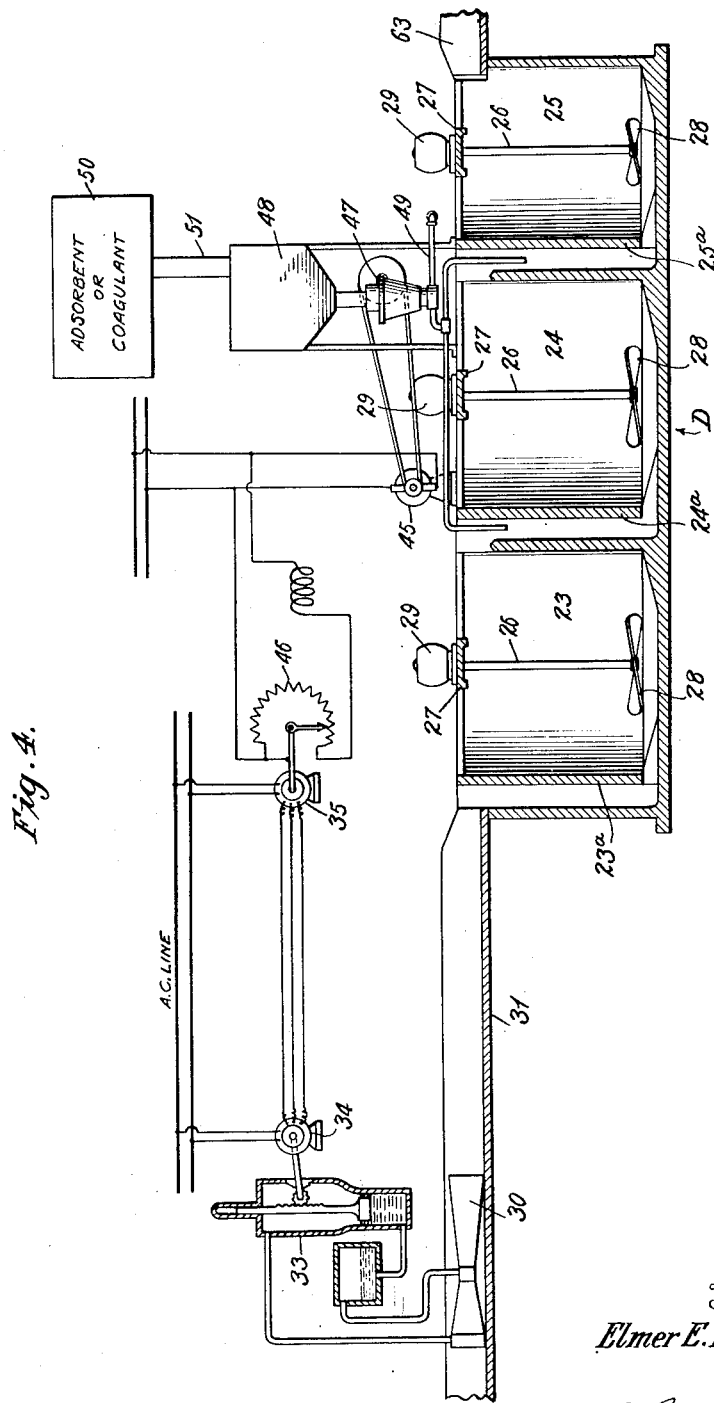

UNITED STATES PATENT OFFICE 1,928,163

PROCESS AND APPARATUS FOR TREATING SEWAGE AND INDUSTRIAL WASTE

Elmer E. Barnard, Lynchburg, Va., assignor, by direct and mesne assignments, to Charles H. Lewis, Harpster, Ohio Application May 12, 1932. Serial No. 610,949

7 Claims. (Cl. 210—2)

This invention relates to an improved process and apparatus for the treatment of sewage and industrial wastes.

It is an object of the invention to provide a novel process and apparatus for the chemical and mechanical treatment of sewage.

More specifically it is an object of the invention to provide an improved process and apparatus for purifying waste liquids containing colloidal matter.

It is a further object to provide an improved process for treating sewage and industrial waste with chemicals such, for example, as shown in United States Patent No. 1,672,587.

In the practice of purification processes necessitating accurate control of the pH (hydroxyl ion concentration), some difficulty has been experienced in controlling the dosage of the chemicals to maintain at all times the requisite pH. It is a purpose of the invention to provide a process and apparatus whereby this difficulty is obviated. The difficulty of control of purification processes has been further increased due to the extreme fluctuations in volume of liquid supplied to the process. This difficulty is pronounced in processes where a definite pH must be maintained since volume has no necessary relation to pH. It frequently happens that a decrease in volume, which ordinarily would dictate a decrease in reagents fed to the liquid, is accompanied by a disproportionate increase in acidity which requires an increase in a particular reagent in order to maintain the necessary predetermined pH. Accordingly it is a purpose of the present invention to provide a process and apparatus in which the supply of reagents to the liquid is subject to a dual control, that is, subject to variations in volume of liquid treated on the one hand and subject to variations in the pH of the liquid on the other.

It is a further object to provide a process and apparatus by which a proper velocity of the liquid is maintained to avoid destruction of flocs when once formed.

It is a further object to provide an apparatus composed of successive units, any of which may be used or by-passed at will.

Other and further objects will be made apparent as the description of the invention proceeds.

Referring to the drawings wherein references denote like parts,

Figure 1 and Figure 1a taken together constitute a plan view of the complete treating unit;

Figs. 2 and 2a together constitute a side elevation of the complete unit shown in Figures 1 and 1a;

Fig. 3 is a detailed view illustrating the feed mechanism and control for supplying the electrolyte solution;

Fig. 4 is a detailed view illustrating the feed mechanism and control for supplying the adsorbent and/or coagulant;

Fig. 5 is a detailed view illustrating the feed mechanism and control for supplying the alkali.

Referring to Figures 1 and 1a and to Figures 2 and 2a, the flow of sewage or industrial waste is from left to right. The entire treating plant embraces a series of parallel units through which the sewage or waste passes in succession. The waste first enters the bar screen units A. It then passes to the detritors B. From the detritors B the waste is passed to the fine screen units C. After leaving the fine screen units C the waste enters the flocculator units D, from whence it passes to the clarifier units E. Effluent from the clarifier units E passes to the receiving stream while sludge passes to the thickeners F. The effluent from the thickeners may be piped back to some convenient point ahead of the flocculators, the thickened sludge being delivered to the vacuum filter units G, where the sludge is dewatered. The filtrate from the vacuum filters may also be piped to some convenient point ahead of the flocculators. The sludge from the vacuum filters G is now conveyed to a rotary drier and after being dried down to a moisture content of not less than 6% it may be collected from the discharge end of the drier and conveyed to suitable storage bin. After it has had sufficient time to collect in the storage bin it is run through a pulverizer and then into a sacking machine.

Returning to receiving end of the plant, the raw sewage enters the plant through the raw sewage flume 1, which connects with the main outfall sewer. From this point the sewage passes through branch flumes 2 to either bar screen A which removes sticks, paper and other coarse materials from the sewage. These are caught on the bars 3 of the screens and prevented from passing on to the subsequent steps in the treatment where such inert material is often very troublesome. These bar screens may be one of the many types now manufactured. In this case they are constructed in the following manner: The bar screens consist essentially of two main parts, the stationary bars 3 forming the screen and the cleaning mechanism 4 for removing the screenings which are deposited on the bars. The bars forming the screens are placed in the channel at an angle of 60 degrees, the opening between the bars depending on local conditions.

The cleaning apparatus 4 consists of a raking mechanism with supporting frame, a drive mechanism with supporting frame, and a rake scraper for removing the screenings from the raking mechanism. The raking mechanism operates on the pantograph principle, with the fulcrum shaft of the driving parallelogram supported in a frame which rests on each side of the channel. The lower members of the driving parallelogram are extended to the stationary screen bars 3 and are connected by a raking plate 5. The forward face of the raking plate 5 is serrated and the projecting fingers dove-tail into the openings between the bars.

The driving parallelogram is actuated through a rack and pinion, the pinion shaft of which is driven by a totally enclosed gear and worm, connected to the motor by a silent Texrope drive.

The path traced out by the pinion shaft is reproduced in a larger path which the raking plate describes. The mechanism is so arranged that on the rising stroke the raking plate 5 travels close to the bars 3 and removes any solids which have been deposited.

As the raking plate 5 clears the top of the bars 3 it comes in contact with a rake scraper which is carried on two hinged arms, supported on the floor. As the raking plate 5 moves upward it carries the rake scraper upward and outward. The scraper moves the screenings across the raking plate, and as it clears the outer edge of the plate, it discharges the solids onto a drainage platform 6 and then drops back by gravity to its original position.

A fixed apron is provided at the upper end of the bars, which prevents screenings from dropping back into the channel as they are discharged. An automatic cut-out switch for the motor, together with a bell alarm may be provided to protect the mechanism against damage in case of an overload. Either unit A may be used by proper control of head gates 7, 8 and 9. If it is desired to by-pass the units A, this can be done by closing head gates 8 and 9 and opening gate 7.

The waste from the bar screens A now passes into the detritor units B which are more commonly known as grit chambers. It is here that the grit is removed from the sewage. The detritors can be one of the many types now manufactured, but in this case they are constructed in the following manner: They consist of two essential elements, the settling tank 10 with collecting mechanism 11, and the washing compartment 12 with cleaning and discharging mechanism.

The settling tank is a square shallow tank along one side of which the sewage enters. The distribution of the inflowing flow is controlled by a series of vertical gates which are set so that the feed enters with a uniform velocity at all points.

The sewage flows off over an effluent weir 14 placed along the opposite side of the tank. The grit collecting mechanism consists of radial raking arms and an oscillating truss, to which also, raking blades are attached. The outer end of the oscillating truss travels on a steel rail which runs around the periphery of the tank, while the other end rests upon a central supporting column. The oscillating truss is driven through a traction wheel that travels on the steel rail and as the truss moves around the tank it also drives the radial raking arms.

The washing compartment 12 is a narrow rectangular inclined channel running along one side of the settling tank and connected to it by a grit discharge chute.

The cleaning mechanism consists of a series of reciprocating rakes, supported from above the tanks. The reciprocating rakes move the grit up the inclined floor of the washing compartment to the discharge point at the upper end.

As the sewage enters along the influent side of the settling tank 10 the coarse grit particles settle to the floor of the tank while the lighter organic material is carried off in the sewage over the discharge weir 14. The settled grit is picked up by the plow blades on the radial raking arms, which sweep it outwards, gradually carrying it to the grit discharge chute. At the outboard end of the raking arms are attached scoops which carry the sand over the discharge chute, whence it drops into the washing compartment 12 by gravity. The function of the raking blades on the oscillating truss is to clean the corners of the tank 10, which are not reached by the radial arms.

As the grit drops into the washing compartment 12 it is picked up by the reciprocating cleaning mechanism 13 and gradually advanced up the sloping floor. The rolling action imparted to the grit by the cleaning mechanism releases any entrained organic material which is then carried back into the settling tank through an organic solids by-pass. The speed of the reciprocating mechanism can be so regulated that the bulky organic material is released without carrying the finer grit particles over the organic by-pass.

The water level in the washing compartment 12 extends to a point about two thirds up the inclined slope and as the washed grit is advanced above this point, the excess moisture drains off and the grit is discharged in a clean, drained condition.

The purpose of the detritors is to reduce the mineral solids load to be handled by the sedimentation units and remove such mineral solids as they are apt to be troublesome in the subsequent treatment steps through the plant.

Either detritor unit B may be used by proper control of head gates 8, 9, 15, 20 and 21 while, if desired, they may be by-passed entirely through gate 15 in the central by-pass flume 16.

The effluent from the detritors B now passes through the flume to the fine screen units C. These fine screen units may be one of the many types now manufactured. In this case they are constructed in the following manner: The fine screens consist of a screen drum 17, screenings pit 18, and screenings dewatering elevator 19. The screen drum is made of manganese bronze screening plates supported by spiders attached to a central vertical shaft. The shaft is carried on two bearings, one at each end of the screen. Both ends of the screen drum are open and are fitted with circular bronze seal rings, arranged to give slight clearance between the screen 17 and concrete screenings pit 18.

The screen plates are perforated with milled slots approximately $\tfrac{1}{16}''$ by $2''$. The perforations are rectangular on the outside and beveled cup-shaped on the inside of the drum. This permits the use of thick, strong plates and prevents solids that start to go through the slots from lodging on the inside and causing trouble.

Right and left hand spiral fins may be attached to the outer surface of the drum. These prevent the deposition of grit under the drum which would cause undue wear on the plates.

The screenings dewatering elevator 19 is a bucket elevator which removes the screenings from the screenings pit. It is equipped with perforated buckets, which allow the screenings to drain during travel. The elevator discharges into either pneumatic ejectors or screenings receptacle enclosed in the housing that covers the elevator.

A floating baffle, which prevents any floating solids from being carried back against the drum may be fitted into the screenings pit. A metal plate baffle is also placed just behind the rising buckets to keep the solids away from the descending chain.

The screen may be driven by a motor through silent, double worm-gear speed reducers. A separate drive unit is provided for the elevator.

The screen drum 17 is partially submerged in the sewage at right angles to the direction of flow, and rotated in a direction counter to the flow of the sewage.

The sewage flows against the outside of the screen and passes through the perforations to the inside, except for the coarse solids which are retained on the outer surface of the drum 17, since one end of the drum is closed off by a seal ring and concrete wall and the screened effluent passes off through the other end which is open. The seal ring at the open end prevents by-passing.

The rotary motion of the screen causes the sewage inside the screen to be elevated on the rising side and, at the point of emergence, a "cascading" action takes place which throws the coarse solids, which have adhered to the outer surface of the drum, into the screenings pit.

The screenings settle in the pit and are removed by the bucket elevator 19, which also picks up floating solids as the buckets emerge from the liquid. The excess moisture drains off through the perforations in the buckets during travel and the screenings are discharged with about 80–85% moisture, in which condition they can be readily disposed of. As in the case of the bar screen units A and detritors B, head gates 20, 21 and 22 are provided for controlling the flow so that either fine screen unit C can be used or both may be by-passed through by-pass flume 16.

The effluent from the fine screen units C is metered and then passes into the flocculator units D. These flocculators are constructed of concrete and are circular in shape, their size being dependent upon the capacity of the unit. Each unit is divided into three separate divisions 23, 24 and 25. The sewage enters the first division 23 of the flocculator units and passes through the succeeding divisions 24 and 25, leaving from the last. In order that there may be proper agitation in the flocculator divisions, a revolving motor driven mechanism is built in each. The agitating mechanism is a heavy pipe shaft 26 revolving in bearing blocks 27 resting on the proper support. Secured to the pipe shaft by clamped blocks are paddle arms 28. These paddles are revolved by a motor 29 of the proper size.

It is at this point that the chemicals are added to the sewage. In the first division the electrolyte is added, in the second division the calcium hydroxide and an adsorbent, and in the third and last division the coagulant is added. As noted above the detention period of the sewage passing through the flocculators is determined by the proper size of the same and the agitation is controlled by the speed of the revolving paddles as previously noted. The chemicals are here added in accordance with a predetermined schedule showing the proper quantity of each, depending upon the quantity of sewage and the quality of the same. The chemical dosing is effected by suitable chemical feeders. The chemical feeders for all chemicals except the calcium hydroxide are controlled by a Venturi meter tube or an electric flow meter placed in the line or flume leading from the fine screen units into the flocculator units. A potentiometer placed in the feed line leading to or in division 23 of the flocculator is used to control the calcium hydroxide feed.

The chemicals to be fed to the flocculator units comprise an electrolyte, which may be a solution of ferric chloride, an adsorbent, which may be Cottrell dust, an alkali, for example, calcium hydroxide, and a coagulant such as ferrous sulphate. These reagents are preferably separately introduced to the flocculator units, the electrolyte solution being introduced to the first division 23, the adsorbent and calcium hydroxide introduced to the second division 24, and the coagulant into the last division 25.

The feed of the electrolyte solution, the adsorbent and the coagulant is in response to variations in volume of the waste treated. It is understood, of course, that the representative quantity of organic matter in the waste is ascertained from time to time by suitable analysis.

The calcium hydroxide is fed in response to variations in the hydroxyl ion concentration of the waste.

The mechanism for feeding the adsorbent and the coagulant are identical in structure while the mechanism for feeding the electrolyte solution differs only slightly therefrom. The four feed mechanisms are diagrammatically shown in association with but one of the flocculator units D in Figures 1 and 1a, it being understood that the feeds are duplicated for the other unit. The units are labeled "electrolyte feed", "adsorbent feed", "alkali feed" and "coagulant feed."

For a detail description of the "electrolyte feed" reference is made to Figure 3. The Venturi-meter 30 which is placed in one of the branch flumes 31 or 32 (Fig. 1) measures the flow to the associated flocculator unit D. Associated with the Venturi-meter 30 is a manometer 33 which functions to control the movement of a primary selsyn motor 34 and thereby effect corresponding movement of a second selsyn motor 35. Movement of the second selsyn motor is transmitted through suitable operative connections 36 to a valve mechanism 37 in the constant level pot 38. The valve mechanism includes an orifice valve 39 for admitting the electrolyte solution from the constant level pot 38 to the feed pot 40 from whence the solution flows by gravity through connection 41 into division 23 of the flocculator unit. The solution is fed from storage vessel 42 through pipe 43 and float valve 44 into the constant level pot 38. The arrangement is such that when the volume flowing through meter 30 increases, there will be transmitted to the valve mechanism 37 a movement resulting in a greater opening of orifice valve 39 and a consequent increase in the amount of solution fed to the waste.

The "adsorbent feed" is shown in Figure 4. Here the Venturi-meter 30, manometer 33 and selsyn motors 34 and 35 which may be the same motor shown in Figure 3, control a direct current motor 45, through the variable resistance 46. The direct current motor 45 drives a rotary feed table 47 which acts to feed the dry adsorbent from hopper 48. Water under pressure is admitted to line 49 and acts to convey the adsorbent from the feed mechanism to the division 24 of the flocculator unit D. The hopper 48 is supplied by gravity from storage bin 50 through chute 51.

The "coagulant feed" is the same in structure as the "adsorbent feed" and may be also operated from the direct current motor 45.

Referring to Figure 3, the selsyn motor 34 may be actuated by the differential in pressure in the manometer 33, for example, in a manner similar to that shown in U. S. Patent No. 1,559,155. The interconnection between the manometer 33 and motor 34 is therefore diagrammatically shown.

Referring to Figure 4 the speed of the direct current motor 45 is controlled by the selsyn motors 34 and 35 through variable resistance 46. The speed of the rotary feed tables is thus responsive to variations in volume of flow through meter 30.

The alkali or calcium hydroxide feed is shown in Figure 5 and includes the potentiometer 52 actuated by the potential created between a tungsten electrode and a calomel half-cell, the entire cell being indicated at 53 as immersed in the waste in division 23 of the flocculator unit D. (It may, however, be located in the flume in advance of the flocculator unit.) This potential is a function of the hydroxyl ion concentration of the raw sewage and its variation indicates a change in the calcium hydroxide demand of the waste. Thus, by converting the variations in potential into corresponding movements, as regards both degree and direction, the calcium hydroxide can be applied to the waste in accordance with the demand as indicated.

The potential may be suitably magnified as, for example, by vacuum tubes 54 so that a variable resistance 55 may be controlled thereby to thus vary the speed of the direct current motor 56 which drives through suitable means 57 the rotary feed table 58 similar in all respects to the rotary feed table 47 of the "adsorbent feed." Table 58 is supplied from hopper 59 which receives calcium hydroxide from storage bin 60 through chute 61. Water under pressure is supplied through line 52 and conveys the calcium hydroxide into division 24 of the flocculator unit D.

The divisions of the flocculator units D are so constructed and baffled by baffles 23a, 24a and 25a that the flow therethrough will be at such velocity as to prevent destruction of the floc formed in the waste as a result of the chemical treatment.

From the flocculator units D the waste passes via flumes 63 and 64 controlled by headgates 65 and 66 into the clarifier units E. A flume 67 interconnects the flumes 63 and 64 and is provided with headgates 68 and 69, by manipulation of which the waste from either flocculator unit D can be passed to either clarifier unit E. The waste entering the clarifiers E passes through a series of submerged inlet ports 70. It is in these clarifiers that the flocculated material settle out, leaving the well claified effluent to be passed into the receiving stream.

The effluent passes through the outlets 71 into the flumes 72 and from here can be passed to the receiving stream either over the open cascade 73 in the open flume 74 where it will be substantially aerated or if the treating unit is not sufficiently elevated from the receiving stream the effluent may pass through the line 75 and blower 76 by which air can be injected to the effluent to facilitate aeration thereof.

The sludge which settles out in the clarifier discharges from the bottom of the clarifier unit E via line 77 and is picked up by sludge pump 78 and thence conveyed through line 79 and port 80 into the thickener units F.

Returning to the clarifiers E each consists of a concrete tank having a sloping bottom. The mechanism in the clarifier consists essentially of a set of raking arms 81 and a drive unit 82 which revolves these arms. The drive unit travels around the periphery of the tank on a steel rail 83 and is connected to the center scrapers by a driving frame 84. The center raking mechanism is attached to a cage-like structure 85 suspended from a bearing at the top of the column in the center of the tank. It will be seen that with every revolution of the drive unit the entire floor of the tank is scraped by the rakes 81 and the settled solids are carried toward the central discharge opening 86 with which the sludge outlet line 77 connects.

The thickener units F are constructed on the same general scheme as the clarifier units E except that they are much smaller.

Valve controlled by-pass lines 87 and 88 interconnect the sludge discharge lines 77 in advance of and beyond the sludge pumps 78. The arrangement is such that either pump can be utilized to convey sludge from either clarifier unit E to either thickener unit F.

The effluent leaves the thickeners F through ports 90, flume 91, and effluent line 92. The effluent from the thickeners F may still contain some organic matter in suspension and, therefore, may be advantageously conveyed by line 92 back to the flume leading from the fine screen units C to the flocculator units D to be again subjected to flocculation and clarification. The final sludge leaves the thickener units F through line 93 and is conveyed to the vacuum filter units G. Each vacuum filter consists of a rotating drum 94 on a horizontal axis 95, the lower part of the drum being submerged in the sludge reservoir 96.

The rotating drum may be made of heavy sheet steel divided on approximately one-foot centers by longitudinal division members, so that each one foot around the periphery is in fact a separate filter. From each of these compartments a pipe may lead to a control valve, and the steel drum between the division members form a drainage compartment. Around the entire drum is stretched open work hose duck somewhat similar to an open burlap, to protect the filter cloth from mechanical wear against the drainage members. The filter cloth is sealed in the division members and around the edges of the drum so that each compartment is positively a separate filter unit. The arrangement is such that the suction pulls the liquid through the filter cloth and leaves the solids on the outside. As the compartment rises out of the liquid it passes a bridge, and then the pipe registers with another port where a higher vacuum is applied, so that the moisture in the solids built up on the filter cloth can be extracted to a low figure.

The filtered sludge is conveyed from the vacuum filter units G by the belt and bucket conveyors 97 to the rotary drier 98 where the moisture can be advantageously reduced to an extent permitting the sludge to be sacked for shipment, it being understood that the sludge product of a process thus derived is a valuable fertilizer. The dried sludge from the rotary driers 98 is now transported by conveyors to a suitable storage tank and from here passes through the proper channel to a sacking machine.

It is unnecessary to here detail a specific illustrative operation of the process since the several reagents are applied to the waste in the direct proportions as indicated by the analysis of the waste substantially in accordance with the teachings of United States Letters Patent No. 1,672,537.

The foregoing detailed description is, of course, to be considered as illustrative and not in limitation of the invention which is comprehended by the appended claims.

Having thus described my invention, what I claim is:—

1. A process for treating organic waste liquids such as municipal sewage comprising initially removing all coarse suspended matter by mechanical means, thence delivering the liquid into the first of a series of flocculators, introducing to the liquid as it progresses through the flocculators an electrolyte producing material, an adsorbent and a coagulant, and in controlling the quantity of at least one of the respective reagents introduced to the liquor in response to variations in volume supplied to the flocculators and controlling the quantity of another of the reagents in response to variations in the hydroxyl ion concentration of the liquid treated, subsequently delivering the liquid to clarifiers where precipitation occurs and from which the clarified effluent and precipitate are separately removed.

2. A process for treating organic waste liquids such as municipal sewage comprising initially removing all coarse suspended matter by mechanical means, thence delivering the liquid into the first of a series of flocculators, introducing to the liquid as it progresses through the flocculators an electrolyte producing material, an adsorbent and a coagulant, and in controlling the quantity of at least one of the respective reagents introduced to the liquor in response to variations in volume supplied to the flocculators and controlling the quantity of another of the reagents in response to variations in the hydroxyl ion concentration of the liquid treated, subsequently delivering the liquid to clarifiers where precipitation occurs and from which the clarified effluent and precipitate are separately removed, and maintaining a velocity of flow through the flocculators and to the clarifiers such that the floc formed is not deleteriously affected.

3. In combination with an apparatus for purifying sewage and industrial waste, feeding mechanism for introducing chemicals to the waste, including calcium hydroxide and an electrolyte, automatic means including a potentiometer for controlling feeding mechanism to vary the quantity of calcium hydroxide fed to the waste in response to variations in the hydroxyl ion concentration of the waste and automatic means for controlling feeding mechanism to vary the quantity of the electrolyte in response to variations in the volume of the waste treated.

4. An apparatus for treating sewage and industrial waste comprising a bar screen, a detritor unit, a fine screen unit, a series of flocculators, a clarifier, a sludge thickener, a vacuum filter and dryer serially connected, means for delivering sewage to the apparatus, means for introducing chemicals to the flocculators, means for withdrawing effluent from said clarifier and from said sludge thickener, and a pump intermediate the clarifier and the sludge thickener.

5. A process for purifying sewage and industrial waste, including the steps of passing the waste in succession through a series of flocculation chambers at a velocity below that at which flocs formed will be destroyed, introducing to the waste as it advances through the series of flocculation chambers an electrolyte, calcium hydroxide and an adsorbent in the order named, and agitating the waste following the introduction of each.

6. An apparatus for treating sewage and industrial waste comprising a detritor unit, a screen unit, a series of flocculators, a clarifier, a sludge thickener, means for delivering sewage to the apparatus, means for introducing chemicals to the flocculators and means for withdrawing effluent from said clarifier and from said sludge thickener.

7. An apparatus for treating sewage and industrial waste comprising a detritor unit, a screen unit, a series of flocculators, a clarifier, a sludge thickener, means for delivering sewage to the apparatus, means for introducing chemicals to the flocculators, means for withdrawing effluent from said clarifier and from said sludge thickener, and means for impelling sludge from the clarifier to the sludge thickener.

ELMER E. BARNARD.